United States Patent [19]
Peterson, Jr.

[11] Patent Number: 5,857,020
[45] Date of Patent: Jan. 5, 1999

[54] TIMED AVAILABILITY OF SECURED CONTENT PROVISIONED ON A STORAGE MEDIUM

[75] Inventor: Mendel Lazear Peterson, Jr., Richardson, Tex.

[73] Assignee: Northern Telecom Ltd., Quebec, Canada

[21] Appl. No.: 566,664

[22] Filed: Dec. 4, 1995

[51] Int. Cl.⁶ .................................................. H04L 9/00
[52] U.S. Cl. ............................. 380/4; 380/20; 380/21; 380/25
[58] Field of Search ................................ 380/4, 16, 20, 380/23, 25, 21, 49

[56] References Cited

U.S. PATENT DOCUMENTS

| | | | |
|---|---|---|---|
| 4,827,508 | 5/1989 | Shear | 380/4 |
| 5,010,571 | 4/1991 | Katznelson | 380/4 |
| 5,204,512 | 4/1993 | Ieki et al. | 235/382 |
| 5,274,221 | 12/1993 | Matsubara | 235/492 |
| 5,325,431 | 6/1994 | Naruse | 380/16 |
| 5,379,344 | 1/1995 | Larson et al. | 380/23 |
| 5,392,353 | 2/1995 | Morales | 380/20 |
| 5,396,558 | 3/1995 | Ishiguro et al. | 380/25 |
| 5,406,624 | 4/1995 | Tulpan | 380/4 |
| 5,412,722 | 5/1995 | Sherly et al. | 380/49 |
| 5,414,773 | 5/1995 | Handelman | 380/49 |
| 5,426,701 | 6/1995 | Herrmann et al. | 380/52 |
| 5,440,632 | 8/1995 | Bacon et al. | 380/20 |
| 5,444,780 | 8/1995 | Hartman, Jr. | 380/30 |
| 5,615,264 | 3/1997 | Kazmierczak et al. | 380/49 |

FOREIGN PATENT DOCUMENTS

| | | |
|---|---|---|
| 0 635 790 A1 | 1/1995 | European Pat. Off. . |
| WO 92/20022 | 11/1992 | WIPO . |

*Primary Examiner*—Salvatore Cangialosi
*Attorney, Agent, or Firm*—Foley & Lardner

[57] ABSTRACT

A service methodology based on distribution of secured content, such as, movies, music, games, information and the like, whereby revenue may be generated for premier and pay-per-use access to the secured content. The service is manifested by the combination of a video disk reader, controller and authorization center. A service provider, for instance, locks up a movie on a video disk for which a premier event viewing date and time may be defined and which the provider may then directly distribute, in advance of the premier event, to potential consumers. Each consumer may purchase the right to view the movie once for a certain fee, for example $5.00, through online access from the controller to the authorization center, but the single viewing will only be allowed by the controller on or after the premier event. Thereafter, the consumer pays for viewing of the movie on a pay-per-use basis or over a defined window of time, perhaps for reduced fee, such as $1.00. Moreover, the online authorization process makes it possible to track consumer preferences at the authorization center, and as an alternative to the online payment processing, smart cards may be utilized for such.

37 Claims, 3 Drawing Sheets

TIMED AVAILABILITY OF SECURED CONTENT PROVISIONED ON A STORAGE MEDIUM

BACKGROUND OF THE INVENTION

The present invention relates, generally, to distribution of secured prerecorded content and, in particular, to a method and an apparatus for enabling access, dependent upon timed availability, to the secured content provisioned on a storage medium, It is known to distribution in bulk (i.e., mass distribution) software packages. Such packages generally comprise a software application in encrypted format on a CD-ROM which is distributed in advance to potential consumers who would either have none or limited use of the software application. Each consumer desiring full use or access thereto typically is required to place a voice call to a 1-800 number and purchase, via credit card, from the distributor a password (decryption) key that is capable of unlocking the encrypted software. A decryption utility which is supplied with the package and executed by the consumer on a personal computer prompts for the key, responsive to which the consumer enters the key and subsequently is allowed to copy the software application onto a disk. Alternatively, the software package may execute functionality to invoke an online connection, when the computer includes a modem, with an automated authorization center from which the key may be downloaded to the computer.

The above distribution technique is limited in its ability to generate revenue from the software package, specifically, to receipt of a single payment for unrestricted use of the software application.

In U.S. Pat. Nos. 4,827,508 to Shear and 5,010,571 to Katznelson, systems for metering access to encrypted data in the form of a database provisioned on a CD-ROM are disclosed. Briefly, in Shear or Katznelson, a CD-ROM containing an encrypted database of interest to a user is distributed typically at nominal cost or at no cost. The user terminal includes a CD-ROM reader, and a remote cryptographic control unit which is provided with stored cryptographic keys needed to access to the database. The amount of actual data use, i.e. the retrieval and decryption of data from the CD-ROM, is metered locally and recorded as a stored data usage record. The charge for data access may be either in accordance with the amount of data decrypted, or in accordance with price information recorded in the respective data headers of each individual data packet.

The local stored data usage record is reported by telephone modem from the remote user terminal to a cryptographic operations center. Each remote cryptographic control unit has a stored user secret key, unique to that user terminal. Communication between the user terminal and the cryptographic operations center is protected by encryption under the user secret key, which is stored in a secure memory in the cryptographic control unit. The user secret key for each user is also stored in the cryptographic operations center. When a remote user terminal calls in and identifies itself, the cryptographic operations center looks up the corresponding user secret cryptographic user key, which is then used to secure the subsequent communication data exchange between the remote user terminal and the cryptographic operations center. Also stored in the cryptographic operations center are the various cryptographic keys corresponding to the available CD-ROM database titles. The user secret key is also used to secure the delivery of secret database keys from the cryptographic operations center to the user terminal for a desired CD-ROM database. After the data usage report is successfully uploaded to the cryptographic operations center, the user is then billed for the actual database usage based on the content of the uploaded data usage report. Thus, rather than being required to purchase an entire CD-ROM database, the user pays only for the amount of data actually used or decrypted from the CD-ROM.

It is, therefore, apparent that more flexible and alternative capabilities to unlock secured prerecorded content whereby revenue generation from distribution thereof is expanded are desirable. Shear or Katznelson provide such capabilities on the basis of measuring actual use of the content. Capabilities based on timed availability to the secured content is a further alternative.

SUMMARY OF THE INVENTION

It is an object of the present invention to provide a new and improved method and apparatus for enabling access, dependent upon timed availability, to secured content provisioned on a storage medium.

The invention, therefore, according to a first exemplary aspect provides a method of controlling access by a user to a data content of a storage medium, the data being encrypted, comprising the steps of: defining a start point in time prior to which decryption of the encrypted data is inhibited; measuring time; and enabling, responsive to the measured time effectively reaching the start point, the decryption of the encrypted data whereby the user has access to the data.

In accordance with a second exemplary aspect, the invention provides a method for controlling decryption of encrypted data, comprising the steps of: defining a start point in time prior to which decryption of the encrypted data is inhibited; measuring time; and enabling the decryption of the encrypted data on and after the measured time effectively reaches the start point.

In accordance with a third exemplary aspect, the invention provided an apparatus for controlling access by a user to content of a storage medium, the content including encrypted data and the medium being readable by a corresponding medium reader from which the apparatus is adapted to receive the content, comprising: means for defining a start point in time prior to which decryption of the encrypted data is inhibited; means for measuring time; and means for enabling, responsive to the time clock effectively reaching the start point, the decryption of the encrypted data whereby the user has access to the data.

A particular embodiment includes a local secure authorization clock which is set and controlled by an authorization center having a master clock. The local clock is secure in that its setting may not be altered by the consumer.

The invention manifests a novel service methodology based on distribution of secured content, such as, movies, music, games, information and the like, whereby revenue may be generated for premier and pay-per-use access to the secured content. A service providers for instance, locks up a movie on a video disk for which a premier event viewing date and time may be defined and which the provider may then directly distribute, in advance of the premier event, to potential consumers. Each consumer may purchase the right to view the movie once for a certain fee, for example $5.00, through online access to an authorization center, but the single viewing will only be allowed on or after the premier event time. Thereafter, the consumer pays for viewing of the movie either on a pay-per-use basis or over a defined window of time, and perhaps for reduced fee such as $1.00. Moreover, the online authorization process makes it possible to track consumer preferences. As an alternative to the online payment processing, smart cards may be utilized for such.

This service creates premier events at a set date and time as well as for subsequent pay-per-view enjoyment of prerecorded movies, music, information, communications, and other electronic entertainment. The service may employ online capabilities to create new distribution options for digital video disk (DVD), CD-ROM, CD, multimedia games and other electronic media. Also, the service authorizes, controls, tracks and creates new billing options for premier events and pay-per view from the prerecorded content.

A particular system for carrying out the service may include a non-alterable, non-volatile read only control data recorded on the DVD, CD-ROM, CD, game cartridges and other electronic media. The control data may provide a content description, start, expiration and other option control marks. The control marks identify the contents and allow synchronization of event start and expiration times, and billing options. A master clock is controlled by an authorization center. A secure authorization clock, set and controlled by the authorization center, is coupled to the consumer's DVD player, PC, CD player, game machine, external modem controller, smart card or PC card. The authorization clock is password protected and not alterable by the consumer. An online authorization process may be implemented which utilizes an authorization window, passwords, and the master and secure authorization clocks to set the start time for the premier event, and also set an expiration date/time if desired.

Furthermore, the service creates many distribution and billing options. For example, in advance of viewing premier, a movie could be distributed on a DVD disk via courier, authorized at a convenient for the consumer during the authorization window in advance of the premier event but not viewed until the date and time of the regional, national or world premier event. Another example, a music video or multimedia game could be distributed on CD or CD-ROM in advance for a world premier on the event date with the option of live online interaction. Additional post premier event viewing could be authorized, tracked and billed via a number of commercial options.

BRIEF DESCRIPTION OF THE DRAWINGS

The invention will be better understood from the following description in conjunction with reference to the accompanying drawings, in which.

DETAILED DESCRIPTION

Figure 1:
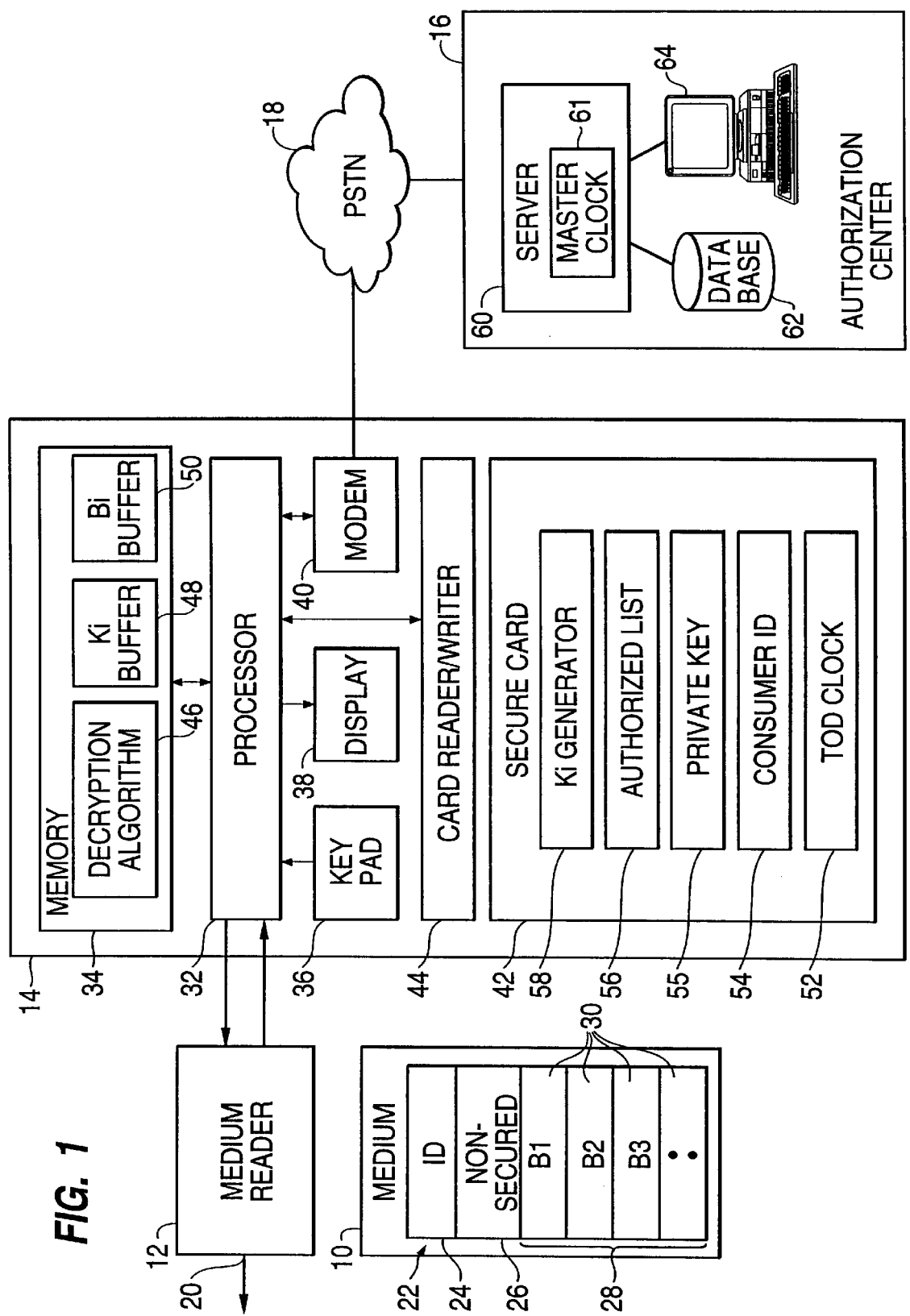
FIG. 1 is a block diagram representation of a first embodiment of an apparatus for unlocking, dependent upon timed availability, a secured content provisioned on a storage medium.

Referring to FIG. 1, depicted for illustration of the present invention is a storage medium 10 and corresponding medium reader 12 which is coupled to a controller 14. Located remotely from the controller 14 is an authorization center 16 to which the controller 14 may establish a communication connection, for example, via a public switched telephone network (PSTN) 18 or other communications link. The storage medium 10 may be provisioned with a data content which is secured such that the data may not be readily accessed or used without prior authorization. The reader 12 is adapted to receive the storage medium 10, the data content from which it retrieves and provides to the controller 14 which in turn functions to unlock the secured data. Unlocking is enabled when the controller 14 is authorized to do so by the authorization center 16 and associated with the authorization may be a time period only during which the unlocking is effected. The unlocked data from the controller 14 may be passed back to the medium reader 12 for further processing, if required, and then accessed at output 20 for utilization by a further device (not shown). As the storage medium 10 contains a secured data content, it may be first distributed in bulk to potential consumers each of whom must subsequently receive authorization in order to access the secured content.

Figure 2:
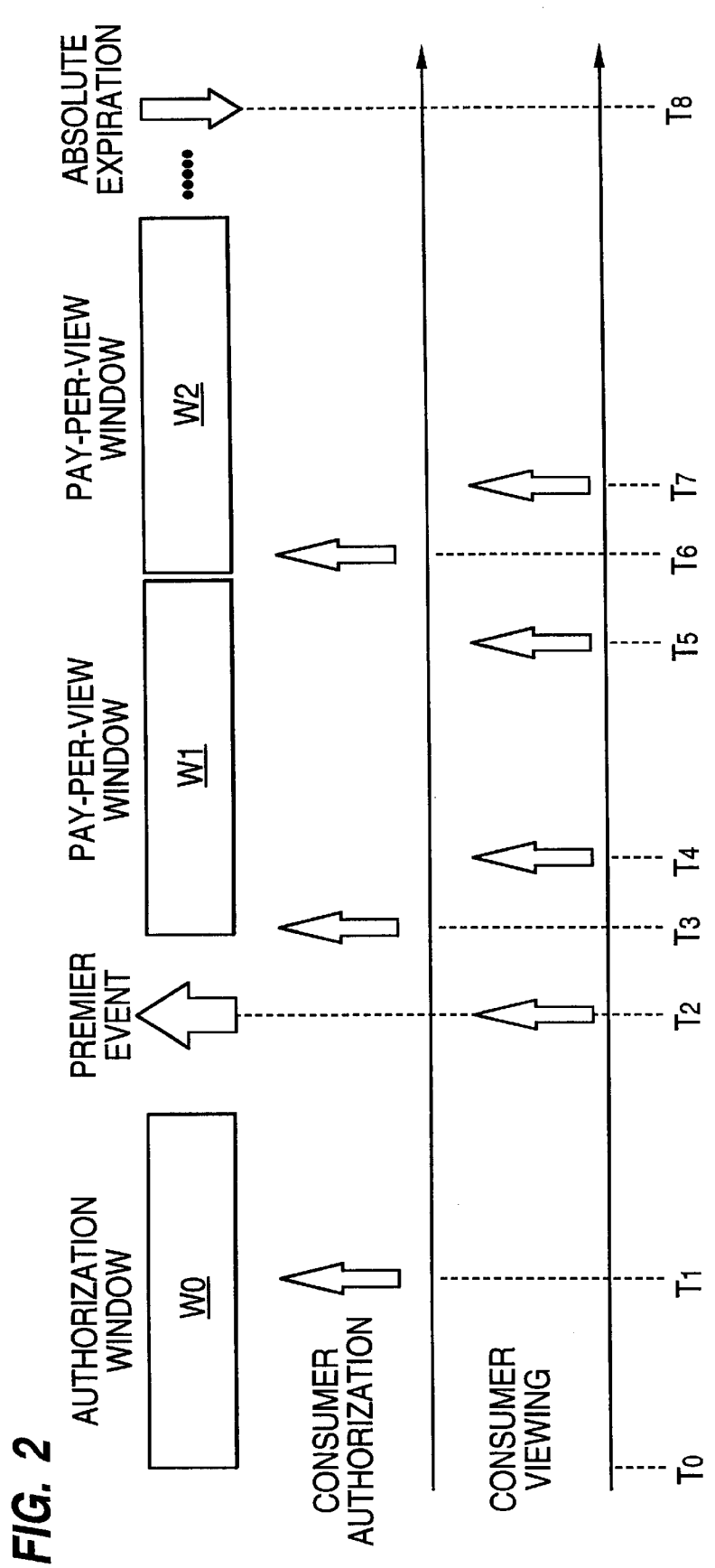
FIG. 2 is a time line chart exemplifying the methodology, in accordance with the invention, for timed availability of the secured content.

Now having regard to FIGS. 1 and 2 together, illustrated in FIG. 2 is a time line chart to exemplify various timed availability schemes, in accordance with the present invention, that are implemented by the apparatus of FIG. 1. One such scheme is to not allow access to the secured contents of the storage medium 10, having been distributed in advance, until a predetermined date and time. This scheme is otherwise referred to herein as a "premier event" type availability of the secured contents. For instance, a consumer may receive the storage medium 10 at time T0 after which there exists a time window W0 within which the consumer may, via the controller 14 and PSTN 18 in this particular embodiment, communicate with the authorization center 16 to request and subsequently receive authorization to access the contents of the storage medium 10. This process of requesting and receiving authorization is represented by the arrow at time T1. Authorization normally is granted on receiving payment from the consumer, in this case, for the requested premier event usage. The controller 14, however, will not enable access to the secured content until the date and time, represented by T2, which is associated with the premier event. Following time T2, a second timed availability scheme is exemplified wherein the consumer requests authorization from the center 16 and receives same in return for payment at time T3, whereby another time window W1 is initiated. The payment for authorization at T3 may be less than that for the premier event made at T1. During window W1, the consumer may be allowed unlimited use of the content on the storage medium 10, as represented by times T4 and T5. This authorization is terminated following expiry of window W1 and thereafter is another window W2 which is initiated by the consumer requesting and receiving authorization at T6, in order to again access the secured content, at T7. A further scheme is to vary the lengths of successive windows, for instance, from one week, to one month and possibly indefinitely. Moreover, only a single use of the content may be allowed which use must occur within the authorized window. It is also possible to implement a combination of the above timed availability schemes, such as, defining a first window during which only single usage is authorized and thereafter defining a succession of windows which begin with a specified number of allowed uses and gradually increase the allowed number over consecutive windows to eventually allow unlimited access. A yet further variant is to provide an absolute expiration date, indicated at time T8, after which it will not be possible to access the secured content thereby effectively removing or withdrawing it from the commercial market. Although the consumer will still have possession of the actual storage medium, on and after time T8 unlocking of the secured content will not be authorized.

Turning back to FIG. 1 only, the storage medium 10 and its data content are intended to be representative of conventional electronic media and content, for example, a compact disk (CD) encoded with a musical data content, a CD-ROM holding computer usable data, a cartridge having video game data, and the like. The preferred storage medium 10 is a digital video disk (DVD) which is capable of holding approximately two movie hours or five gigabytes of data on each side thereof. Moreover, the DVD standard serves as video, CD-ROM, CD and data distribution and consequently a single DVD reader may be utilized in various applications.

The data content, visually represented by reference 22, of the storage medium 10 may include an identifier 24 and non-secured data 26 in addition to secured data 28. The identifier 24 is, for example, a serial number that may be utilized in the authorization process to identify the particular secured data 28 to which access is desired. The non-secured data 24 constitutes a "free" sampling of the secured data 28 as it may be readily accessed, without authorization, by a potential consumer and is provided as a means for enticing the consumer to pay for access to the secured data content.

Locking and unlocking of the secured data 28 content may be effected through a combination of symmetric key cryptography and public key cryptography techniques which are compliant with the United States data encryption standard (DES). A characteristic of symmetric cryptography is that the same key, K, is utilized in both the encipherment and decipherment of data. The public key cryptography is applied to encrypt key K uniquely for a specific consumer under a public key associated with that consumer. A preferred embodiment of the secured data 28 consists of a plurality of contiguous blocks 30, labeled $B_1$, $B_2$, $B_3$, etc., each containing data encrypted by respective keys $K_1$, $K_2$, $K_3$, etc. The secured data 28 is arranged on the storage medium 10 and the reader 12 operated such that consecutive blocks 30 may be retrieved sequentially by the reader 12. The application of combined symmetric key and public key cryptography to the present invention is described in more detail below.

The controller 14 comprises a processor 32 operating in conjunction with a memory 34, keypad 36, display 38, modem 40 and a combination of a secure card 42 with a corresponding card reader/writer 44. The processor 32 functions, under the control of software stored in the memory 34, to receive data from the medium reader 12 and appropriately process the received data in order to unlock the secured (i.e., encrypted) data 28, subject to authorized and timed access, which data may then be provided via the reader 12 at output 20. The memory 34 includes a data block ($B_i$) buffer 46, a block decryption key ($K_i$) buffer 48 and a decryption algorithm 50. The $B_i$ buffer 46 stores individual encrypted data blocks 30 of the secured data 28 for the decryption process. The $K_i$ buffer 48 stores a respective symmetric key which corresponds to a particular data block 30 in the $B_i$ buffer 46 and is applied with algorithm 50 by processor 32 to decrypt (i.e., unlock) that encrypted data block. The keypad 36 and the display 38 constitute means by which a user may interact with the controller 14, and the modem 40 provides an interface to the PSTN 18 whereby the processor 32 may communicate with the authorization center 16.

The secure card 42 and reader/writer 44 are conventional devices. Smart cards and PCMCIA cards are examples of the secure card 42 which typically contain a processor, clock circuit and non-volatile memory. Furthermore, smart cards and PCMCIA cards are known to be equipped with security features to prevent access to and tampering with data in its memory. The card reader/writer 44 is adapted to removably receive the secure card 40 and enables the processor 32 to communicate therewith.

In this particular embodiment of the controller 14, the secure card 42 is programmed to provide a time of day (TOD) clock 52, a consumer identifier 54, a private key 55, a list 56 of authorization records and a block decryption key ($K_i$) generator 58. The TOD clock 52 represents means for measuring time and is a well known capability consisting of a time clock and a date calendar, the settings for which may be password protected and either set online by the authorization center 16 or preset prior to issuance of the card 40 if it includes a battery cell whereby the clock circuit is constantly powered. Hence, the TOD clock 52 may not be altered by the consumer thereby ensuring compliance with the timed availability conditions for the secured content 28. The consumer identifier 54 is effectively an account number by which a particular consumer is known at the authorization center 16. The private key 54 may be a RSA (i.e., Rivest, Shamir and Adleman) key that is uniquely associated with the consumer and corresponds to a public key held at the authorization center 16, but the private key 54 is not known by the authorization center 16. The list of authorization records 56 contains a separate record for each secured content to which access has already been authorized by the authorization center 16. Each authorization record contains: the identifier 24 of the secured content 28 on storage medium 10; a start date and time at which access thereto may be enabled; an expiration date and time after which authorization lapses or is no longer in effect; a limit for usage; and a key K on which securing of the data content 28 was based. The start and expiration dates and times define the window or period of timed availability during which access to the secured content 28 may be enabled. The usage limit defines the number of accesses to the secured content that may be made during the window and typically is either one or unlimited.

The $K_i$ generator 56 functions to generate a block decryption key $K_i$ that is needed to decrypt the particular data block 30 stored in the $B_i$ buffer 50. Generation of the block decryption key $K_i$ is effected for each data block 30, represented by $B_i$, and is based on a proprietary algorithm which accepts as input the key K retrieved from the authorization record for that secured content 28 and another value uniquely associated with that data block 30, such as, an indication of its position in the sequence for the contiguous data blocks 30. For example, $B_1$ denotes the initial or first block 30 of secured data 28 and its corresponding decryption key $K_1$ is derived by the $K_i$ generator 56 based on key K and a sequence indicator value of 1. The sequence indicator may be encoded into each data block 30 or generated by the controller 14 which has an intimate knowledge of the physical arrangement of the storage medium 10 and the partitioning for its secured content 28. The use of a plurality of key $K_i$, derivable from a single key K, to encrypt and decrypt corresponding blocks $B_i$ of secured content provides an extra layer of security from potential attackers. As the key $K_i$ for decrypting the content changes frequently ($K_1$, $K_2$, $K_3$, etc.) during the decryption process, if the attackers are not able to compromise the security features of the secure card 42 to extract key K and the algorithm for $K_i$ generator 58 therefrom then it would be necessary to convey the entire sequence of $K_i$ keys to others in order to gain unauthorized access to the secured content 28. For example, if a new 8 byte key is supplied every millisecond over the course of a two hour movie, there is a total 55 Mbytes of keys that must be provided to the unauthorized others.

The authorization center 16 is embodied by an online computer server 60, a database 62 and a workstation 64. The server 60 functions to automatically accept incoming calls, process authorization requests and grant authorization where appropriate, and may provide a master clock 61 based on which the TOD clock 52 of the controller 14 may be set and controlled. It maintains in the database 62 a list of identifiers which correspond to the identifiers 24 of any secured content 28 that may have been distributed. Associated with each identifier is a control record defining availability conditions for the particular secured content 28. The control record may include the key K from which the sequence of decrypting keys $K_i$ needed for decryption of the secured content 28 are derived, premier date and time values, and a window definition having parameters for specifying: a time limit (i.e., number of days and/or hours) for which granted authorization is to be effective; a usage limit indicating whether a specific number, such as one, or unlimited use is authorized over the specified number of days; and a cost for the usage. Alternatively, a plurality of window definitions which are applicable over respective chronological time periods may be employed in order to alter the parameters, such as cost and usage limit, over time. Furthermore, the control record may include an absolute expiration date, after which authorized use of the secure content 28 will no longer be granted.

The server 60 also maintains in the database 62 a directory of identifiers for consumers and corresponding account records. Each consumer account record contains a public key associated with the consumer, and an amount of prepaid funds or credit limit available in the account. The workstation 64, operated by an attendant, interacts with the server 60 to provide manual assistance when needed for processing of an incoming call, to update certain records in the database 64, and it captures consumer identifiers together with secure content identifiers to generate statistical data whereby consumer usage and preferences may be tracked.

In operation, a consumer normally receives, in advance of a predetermined premier event date, a storage medium 10 having secured content 28, for instance, a DVD disk containing a movie production which is encrypted together with non-secured (non-encrypted) data 24 including a sample trailer and audio/visual instructions explaining particulars for access to the encrypted movie. The consumer would apply the medium 10 (DVD disk) to the medium reader 12 and the output 20 thereof would be connected, in this particular context, to a television set or monitor of a home theater system. The processor 32 of controller 14 forwards any non-encrypted video data received from the reader 12, without any processing of the that data, back to the reader 12 which in turn processes the data stream to generate appropriate analog video signals at its output 20, thereby allowing the consumer to access and view the trailer and instructions but not the actual movie. If interested in viewing the movie production, the consumer indicates this desire to the controller 14 by depressing an appropriate key on the keypad 36 which generates a corresponding signal that is received by the processor 32. Responsive thereto, the processor 32 first determines whether an authorization record already exists in the list 56 for the identifier 24 provided on the medium 10 and received from the reader 12.

Assuming in this instance that authorized access to the secured content 28 had not been previously requested and granted, the processor 32 utilizes the modem 40 to establish a connection through the PSTN 18, by dialing a specific 1-800 number, with the authorization center 16 whereby online communication with the server 60 may be effected. The processor 32 transmits, via the modem 40, an authorization request message to the server 60. The authorization request message includes the identifier 24 of movie production and the identifier 54 of the consumer which it retrieves, via reader/writer 44, from the secure card 42. The server 60 at authorization center 16 utilizes the secured content identifier and the consumer identifier included in the authorization request message to retrieve, respectively, the corresponding control record and consumer account record which are stored in the database 62. The server 60 applies the amount specified for cost of usage in the control record against the consumer's account and where sufficient funds or credits are present, subsequently generates an authorization granted message which the server 60 transmits through the PSTN 18 to the controller 14. The authorization granted message indicates: the identifier 24 of the secured content 28 to which access is now authorized; the start date and time at which access to the secured content (i.e., unlocking) may be enabled; the expiration date and time after which authorization lapses; the usage limit; and the key K which is encrypted, for security, by the server 60 under the public key of the consumer. Alternatively, the entire content of the authorization granted message may be encrypted under the consumer's public key. In connection with a premier event, the start date and time values are the premier date and time values taken from the control record, and the expiration date and time values may be calculated from the start values plus a time limit offset which may be a predetermined default value, for example, twenty-four hours or the limit specified in the window definition. The usage limit may be any value but normally is one for a premier event. For authorizations following the premier event, the start date and time values would be those current when the authorization request message is received in order to allow immediate access to the secured content 28, the expiration date and time being calculated therefrom using the time limit specified in the window definition of the control record. The usage limit would be that specified in the control record. An alternative to specifiying the exact date/time of expiration is to instead specify a window (i.e., period) of time, such as one day or one week, during which use is authorized and which window is effective beginning on the specified start date. The TOD clock 52 may, in this context, be employed as a means to measure time by counting down the units of time in the window until it is no longer valid. The processor 32 of the controller 14 utilizes the secure card 42 to store the contents of the received authorization granted message as an authorization record in the list 56.

In respect of secured content 28 for which an authorization record does exist in the authorization list 56, the processor 32 verifies when access thereto is requested by the consumer that such access is to be enabled by comparing the current date and time, supplied by TOD clock 52, to the start and expiration dates and times specified in the authorization record. When the start date and time are later than the present parameters, then the processor 32 will not attempt to decrypt the secured content 28. When the present date and time are later than the expiration parameters, again the processor 32 will not enable access to the secured content and also it will remove, via the reader/writer 44, that authorization record from the authorized list 56. Alternatively, the processor on board the secure card 46 may be programmed to govern issuance of the decrypting keys $K_i$ only when warranted by verifying the requested access does comply with the conditions of the authorization record, and it may monitor for authorization records which lapse to automatically delete same.

When the current date and time are within the start and expiration dates and times of the authorization record, the processor 32 then proceeds with the decryption process whereby the secured content 28 is unlocked. Such involves the processor 32 providing a sequence indicator value of one to the $K_i$ generator 58 which then initiates generation of decrypting keys $K_i$ beginning with $K_1$ that corresponds to the first block 30 ($B_1$) of secured content 28 and continuous, unless interrupted by the processor 32, to automatically generate successive keys thereafter, namely $K_2$, $K_3$, etc., knowing that the encrypted data blocks 30 are retrieved sequentially. The generation of decrypting keys $K_i$ requires the secure card 42 first to decrypt encrypted key K, retrieved from the authorization record, using the private key 55. The $K_i$ generator 59 then utilizes the decrypted key K and the sequence indicator value to generate the successive decrypting keys $K_i$ each being provided sequentially to the processor 32 as needed.

The processor 32 continues with the decryption process by retrieving, via the medium reader 12, each encrypted data block 30 beginning with block $B_1$ which is stored in $B_i$ buffer 48 and, via card the reader/write 44, each decrypting key $K_i$ beginning with key $K_1$ which is stored in $B_i$ buffer 48. Then the processor 32 applies the decryption algorithm 46 together with the key in $K_i$ buffer 48 to the encrypted data in $B_i$ buffer 50 thereby effecting decryption of that data block and the decrypted data is provided at output 20. The processor 32 repeats these steps for each block 30 of the secured content 28.

Figure 3:
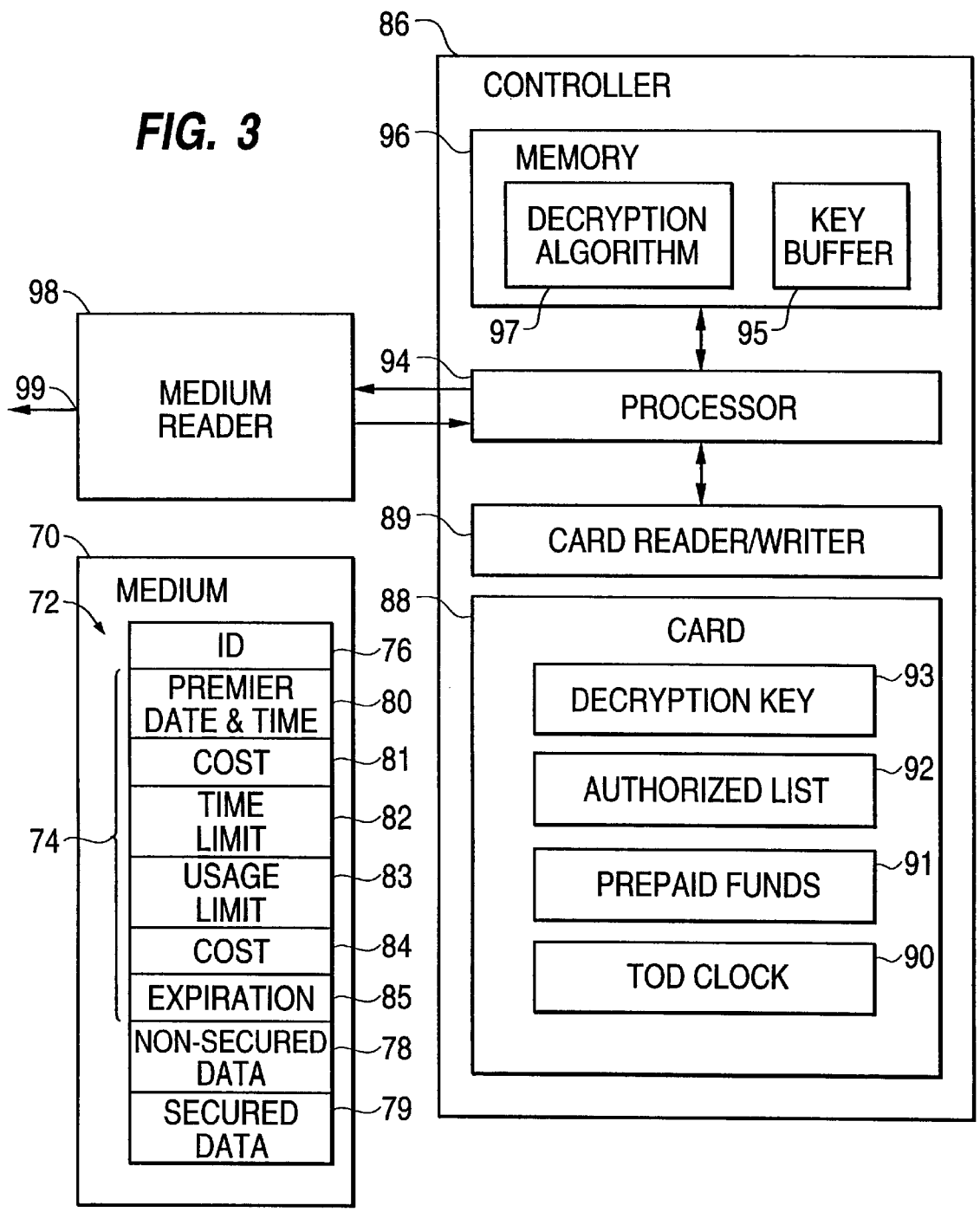
FIG. 3 is a block diagram of another embodiment of the apparatus to unlock the secured content.

Another embodiment of the apparatus, in accordance with the invention, to unlock secured data of a storage medium dependent upon timed availability is illustrated in FIG. 3. The content of the storage medium 70 includes, as visually represented by reference 72, control data 74 in addition to the content identifier 76, the non-secured data 78 and the secured data 79. The control data 74 may comprise premier date and time values 80 with associated cost 81, window definition parameters specifying a time limit 82, usage limit 83 and cost 84 subsequent to premier event, and an absolute expiration date 85 after which access to the secured content will not be granted. Furthermore, in this embodiment of the controller 86 the secure card 88 is programmed to provide the TOD clock 90 and as well maintain an amount of funds 91 prepaid by the consumer, a list 92 of authorized access records and a decryption key 93. The amount of prepaid funds 91 may be adjusted in return for receiving monetary compensation and the particular decryption key 93 updated periodically, for instance, by an authorization center (not shown) which the consumer may visit for manual updating of these values or through an automatic online process.

To unlock the secured content 88, the processor 94 provides the content identifier 76 and control data 74, via the reader/writer 89, to the secure card 88 which in turn performs authorization processing. The secure card 88 first determines whether an authorization record exits in the list 92 corresponding to the identifier 76. When an authorization record does not exist, the processor 94 then determines the start and expiration times/dates based on the TOD clock 90 which together with the usage limit 83 defined a new authorization record that is added to the list 92. The prepaid funds 91 is decrement by the appropriate amount, either cost 75 or 78 as specified in the control data 74, which is applicable under the present access context. When the TOD clock 90 indicates the current date as being subsequent to the absolute expiration date 85 specified on the storage medium 70, the processor 94 will not authorize access to the secured content 79.

Following determination that an authorization record does exist or the addition of a new record if not, the secure card 88 next confirms that access to the particular secured content is valid in respect of the present date and time, responsive to which it either provides or refuses to provide the decryption key 93 to the processor 94. Upon receiving the decryption key 93 from the secure card 88, the processor 94 stores it in key buffer 95 of local memory 96 and applies it together with decryption algorithm 97 to the encrypted data received from the reader 98. The decrypted data is provided to the medium reader 98 for further processing, if appropriate, and then made accessible at output 99. The secure card 88 updates the authorization record upon the consumer accessing the secured data and when an authorization record is no longer valid, namely when the expiration date has passed or the usage limit has been reached, that record is deleted from the authorization list 92.

Although the above embodiments describe attaching control conditions to a particular secured content, it should be apparent to a skilled artisan that a possible variant is to incorporate a single set of control data into the memory of the controller whereby the control data may be applied as the default timed availability conditions to unlocking of all secured content. Another variant is to build a secure memory and secure TOD clock directly into the controller as a substitute to utilizing the combination of a secure card and card reader/writer. A yet further variant is to have the consumer manually carry out the authorization request and grant process by placing a voice call to the authorization center and interact either with an automated or human attendant to obtain an authorization code, encoded into which would be the decryption key and which may then be entered manually at the controller though the keypad.

Those skilled in the art will recognize that these and other modifications and changes could be made to the invention without departing from the spirit and scope thereof. It should therefore be understood that the claims are not to be considered as being limited to the precise embodiments set forth above, in the absence of specific limitations directed to each embodiment.

I claim:

1. A method of controlling access by a user to a data content of a storage medium, the data being encrypted, comprising the steps of:

examining an at least three element authorization record which comprises the elements of an unencrypted start time prior to which decryption is inhibited, a decryption key and one of an expiration time or a usage limit, wherein the elements define access restrictions;

measuring time; and enabling, responsive to the examination of the access restrictions, the decryption of the encrypted data whereby the user has access to the data.

2. A method as claimed in claim 1, comprising the steps of:

requesting access to the encrypted data from an authorization center; and receiving authorization which includes a key for the decryption of the encrypted data.

3. A method as claimed in claim 2, wherein the step of defining the start point in time comprises providing an indication of the start point with the authorization.

4. A method as claimed in claim 2, wherein the step of defining the start point in time comprises providing an indication of the start point on the storage medium.

5. A method as claimed in claim 2, wherein the access request includes an identifier of the user and an identifier of the encrypted data, and further comprising tracking by the authorization center usage of the user.

6. A method as claimed in claim 1, wherein the step of defining the start point in time comprises providing an indication of the start point on the storage medium.

7. A method as claimed in claim 1, comprising the steps of:

defining an expiration point in time; and inhibiting, responsive to the measured time effectively reaching the expiration point, the decryption of the encrypted data whereby the user is prevented access to the data.

8. A method as claimed in claim 7, comprising the steps of:

requesting access to the encrypted data from an authorization center; and receiving authorization which includes a key for the decryption of the encrypted data.

9. A method as claimed in claim 8, wherein the steps of defining the start point in time and defining the expiration point in time comprise providing an indication of the start point and an indication of the expiration point with the authorization.

10. A method as claimed in claim 8, wherein the steps of defining the start point in time and defining the expiration point in time comprise providing an indication of the start point and an indication of the expiration point on the storage medium.

11. A method as claimed in claim 8, wherein the access request includes an identifier of the user and an identifier of the encrypted data, and further comprising tracking by the authorization center usage of the user.

12. A method as claimed in claim 7, wherein the steps of defining the start point in time and the expiration point in time comprise providing an indication of the start point and an indication of the expiration point on the storage medium.

13. A method as claimed in claim 7, comprising the steps of:

defining a usage limit;

metering usage of the data content; and inhibiting, responsive to the metered usage reaching the usage limit, the decryption of the encrypted data.

14. A method as claimed in claim 13, comprising the steps of:

requesting access to the encrypted data from an authorization center; and receiving authorization which includes a key for the decryption of the encrypted data.

15. A method as claimed in claim 14, wherein the steps of defining the start point in time, defining the expiration point in time and defining the usage limit comprise providing an indication of the start point, an indication of the expiration point and an indication of the usage limit with the authorization.

16. A method as claimed in claim 14, wherein the steps of defining the start point in time, defining the expiration point in time and defining the usage limit comprise providing an indication of the start point, an indication of the expiration point and an indication of the usage limit on the storage medium.

17. A method as claimed in claim 14, wherein the access request includes an identifier of the user and an identifier of the encrypted data, and further comprising tracking by the authorization center usage of the user.

18. A method as claimed in claim 13, wherein the steps of defining the start point in time, defining the expiration point in time and defining the usage limit comprise providing an indication of the start point, an indication of the expiration point and an indication of the usage limit on the storage medium.

19. A method as claimed in claim 2, wherein the step of measuring time includes providing secure time clock means for measuring time, the time clock means being secure such that it can not be altered by the user.

20. A method as claimed in claim 19, comprising setting the secure time clock means by the authorization center.

21. A method as claimed in claim 20, wherein the secure time clock means is password protected.

22. A method as claimed in claim 2, comprising providing a secure device having a time clock means for measuring time and a memory in which a key for decryption of the encrypted data is stored.

23. A method as claimed in claim 2, comprising providing non-encrypted data on the storage medium, and enabling access thereto without authorization.

24. A method of controlling decryption of encrypted data, comprising the steps of:

examining an at least three element authorization record which comprises the elements of an unencrpyted start time prior to which decryption is inhibited, a decryption key and one of an expiration time and a usage limit, wherein the elements define access restrictions;

measuring time; and enabling the decryption of the encrypted data after the measured time effectively reaches the start time.

25. A method as claimed in claim 24, comprising the steps of:

defining an expiration point in time; and inhibiting the decryption of the encrypted data after the measured time effectively reaches the expiration point.

26. A method as claimed in claim 24, comprising the steps of:

defining a usage limit;

metering usage of the data content; and inhibiting the decryption of the encrypted data once the metered usage reaches the usage limit.

27. An apparatus for controlling access by a user to content of a storage medium, the content including encrypted data and the medium being readable by a corresponding medium reader from which the apparatus is adapted to receive the content, comprising:

means for defining a start time prior to which decryption of the encrypted data is inhibited;

means for storing an at least three element authorization record, which authorization record comprises the elements of the start time which is unencrypted, a decryption key and one of an expiration time or a usage limit, wherein the three elements define access restrictions;

means for measuring time; and means for enabling, responsive to the access restrictions, the decryption of the encrypted data whereby the user has access to the data.

28. An apparatus as claimed in claim 27, comprising:

means for requesting access to the encrypted data from an authorization center; and means for receiving authorization which includes a key for the decryption of the encrypted data.

29. An apparatus as claimed in claim 28, wherein the means for defining the start point in time comprises providing an indication of the start point with the authorization.

30. An apparatus as claimed in claim 28, wherein the means for defining the start point in time comprises providing an indication of the start point on the storage medium.

31. An apparatus as claimed in claim 27, wherein the means for defining the start point in time comprises providing an indication of the start point on the storage medium.

32. An apparatus as claimed in claim 27, comprising;

means for defining an expiration point in time; and means for inhibiting, responsive to the measured time effectively reaching the expiration point, the decryption of the encrypted data whereby the user is prevented access to the data.

33. An apparatus as claimed in claim 32, comprising:

means for requesting access to the encrypted data from an authorization center; and means for receiving authorization which includes a key for the decryption of the encrypted data.

34. An apparatus as claimed in claim 33, wherein the means for defining the start point in time and means for defining the expiration point in time comprise providing an indication of the start point and an indication of the expiration point with the authorization.

35. An apparatus as claimed in claim 33, wherein the means for defining the start point in time and means for defining the expiration point in time comprise providing an indication of the start point and an indication of the expiration point on the storage medium.

36. An apparatus as claimed in claim 32, wherein the means for defining the start point in time and means for defining the expiration point in time comprise providing an indication of the start point and an indication of the expiration point on the storage medium.

37. An apparatus as claimed in claim 32, comprising:

means for defining a usage limit;

means for metering usage of the data content; and means for inhibiting, responsive to the metered usage reaching the usage limit, the decryption of the encrypted data.

\* \* \* \* \*